April 11, 1961     E. F. STOVER     2,978,907
PNEUMATIC MEASURING APPARATUS
Filed Jan. 25, 1957
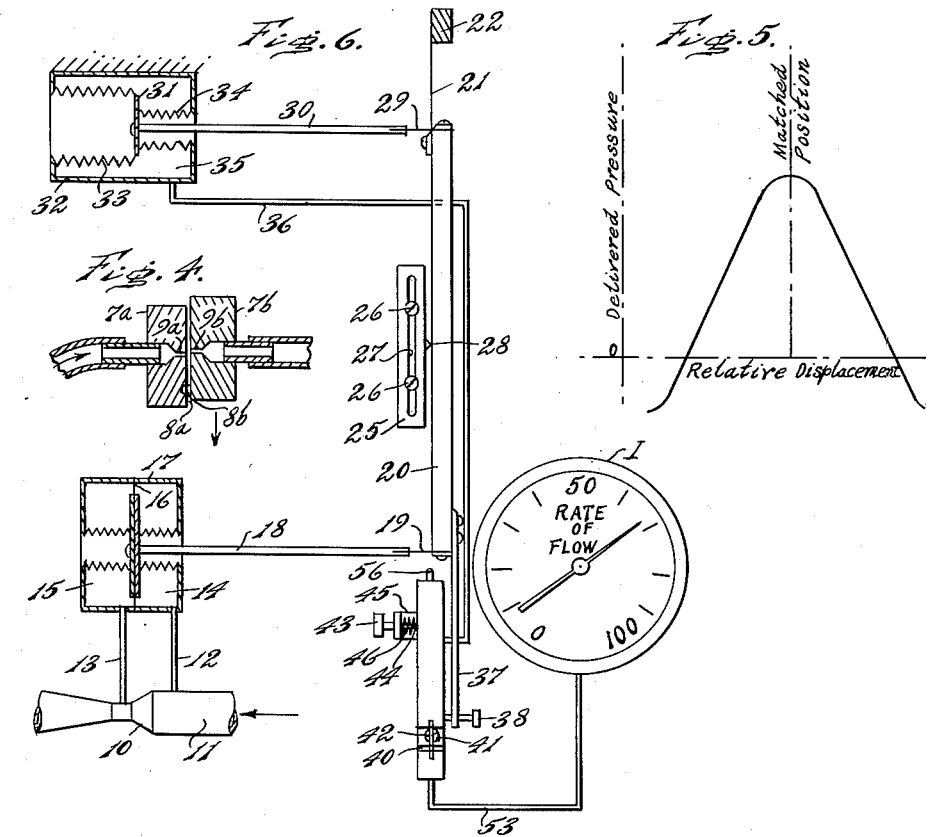
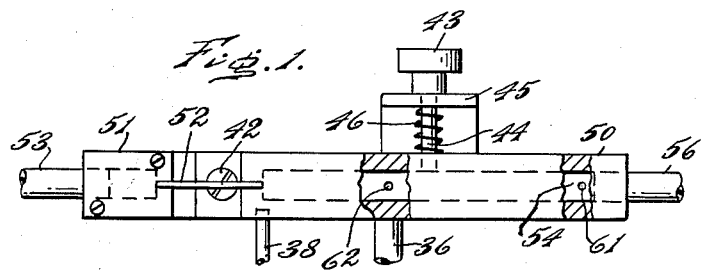
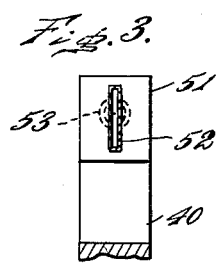
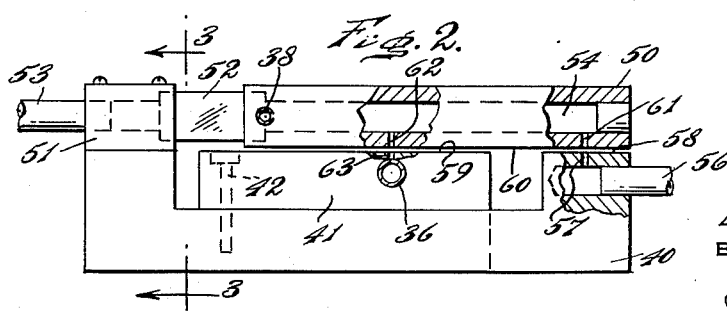
INVENTOR
E. F. Stover
BY
ATTORNEY

United States Patent Office 2,978,907
Patented Apr. 11, 1961

2,978,907
PNEUMATIC MEASURING APPARATUS
Emory Frank Stover, 1224 Lafayette Road, Gladwyne, Pa.

Filed Jan. 25, 1957, Ser. No. 636,360

7 Claims. (Cl. 73—407)

This invention relates to measuring apparatus and more particularly to apparatus for obtaining a square root relation of a condition or force to be measured.

It is the principal object of the present invention to provide measuring apparatus for directly obtaining, in a simple and expeditious manner, a square root relation of a force, differential pressure, or other variable to be measured.

It is a further object of the present invention to provide measuring apparatus which can be quickly and easily adjusted for directly obtaining, in terms of fluid pressure, a square root relation.

It is a further object of the present invention to provide measuring apparatus which is suitable for use in a variety of applications including flow measurement and the like.

Other objects and advantageous features of the invention will be apparent from the description and claims.

The nature and characteristic features of the invention will be more readily understood from the following description, taken in connection with the accompanying drawings forming part thereof, in which:

Figure 1 is a top plan view of a preferred form of measuring apparatus in accordance with the invention, parts being broken away to show the details of construction.

Fig. 2 is a side elevational view of the apparatus shown in Fig. 1, parts being broken away to show the details of construction;

Fig. 3 is a fragmentary sectional view, on a slightly larger scale, taken approximately on the line 3—3 of Fig. 2;

Fig. 4 is a diagrammatic view, for purposes of illustration, of related orifices;

Fig. 5 is a chart illustrating the relation between relative displacement and delivered pressure of orifices employed in connection with the invention; and Fig. 6 is a diagrammatic view of one mode of use of the measuring apparatus in accordance with the invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to Fig. 4 of the drawings, there is there shown for purposes of explanation, two blocks 7a and 7b with flat facing surfaces 8a and 8b having small orifices 9a and 9b perpendicular to the surfaces 8a and 8b. The surfaces 8a and 8b are separated by a few thousandths of an inch. If the orifice 9a is supplied with air under constant pressure and the block 7b is moved in a parallel direction with the separation of the surfaces 8a and 8b retained, the pressure delivered to the orifice 9b in the block 7b is directly proportional to the relative movement of the blocks 7a and 7b until the orifices 9a and 9b are nearly in line. If the block 7b is moved in the opposite direction, the delivered pressure will drop below the ambient pressure still in a linear manner for some distance from the overlapped positions of the orifices 9a and 9b. A part of the delivered pressure fluid can be withdrawn and this does not disturb the existing relation.

The relation of delivered pressure to displacement is graphically illustrated in Fig. 5 in which values of displacements on both sides of a matched orifice position are shown as abscissas and values of delivered pressures as ordinates.

The shapes of the orifices do not seem to be significant and the same results are obtainable with orifices of circular cross section and orifices of rectangular cross section and whether the approach of the latter is with sides parallel or non-parallel.

Referring now more particularly to Fig. 6 of the drawings, a primary metering device is shown which is adapted for obtaining a differential pressure or force derived from fluid flow through conduits in which venturi tubes, orifices, nozzles, or pitot tubes are connected, or from pitot tubes employed for obtaining the speed of ships, airplanes, or the like.

For purposes of explanation, the primary metering device is shown in the form of a venturi tube 10 connected in a conduit 11 for measuring the rate of flow of fluid through the conduit 11. The upstream or high pressure side of the primary metering device 10 has a pipe 12 connected thereto and the downstream or low pressure portion of the primary metering device 10 has a pipe 13 connected thereto.

The pipes 12 and 13 are respectively connected to chambers 14 and 15 separated by a diaphragm 16 or the like in a fixedly mounted casing 17. The areas on the opposite sides of the diaphragm 16 are preferably equal and the diaphragm 16 has a rod 18 connected thereto for applying a force derived from the differential of the pressures effective in the chambers 14 and 15. The rod 18 is preferably connected to a vertical lever 20 through a friction-free connection, such as by a flexible strip 19 extending axially therefrom and connected to the lever 20 substantially normal to the longitudinal axis thereof. The lever 20 is preferably supported by a flexible strip 21 carried by a fixed support 22.

An adjustable block 25 is provided having holding screws 26 extending through a slot 27 therein to permit of vertical adjustment thereof and the block 25 has a fulcrum or knife edge 28 adjustable, by positioning of the block 25, along the lever 20 to permit varying the ratio of the lever arms on either side of the fulcrum 28 as hereinafter explained.

The lever 20 also has connected thereto, by a flexible strip 29 disposed normal to the longitudinal axis of the lever 20 a rod 30. The rod 30 is connected to a plate 31 supported in a fixedly mounted housing 32 by flexible metallic bellows 33 and 34 or the like secured thereto and providing an internal area within a chamber 35 to which pressure is supplied through a fluid connection 36, as hereafter explained. The lever 20 is provided with an extension 37 through which a screw 38 extends, for purposes to be described.

Referring now more particularly to Figs. 1, 2 and 3 of the drawings, a fixedly mounted base 40 is provided, preferably substantially in alignment with the lever 20. The base 40 has a block 41 mounted thereon by means of a screw 42 extending therethrough and into the base 40. The block 41 is preferably held in the desired position of adjustment by an adjusting nut 43 on a threaded stud 44 fixed on the block 41 which extends through a bracket 45 carried by the base 40, a spring 46 being interposed between the bracket 45 and the block 41.

A block 50 is provided, movable with respect to the block 41 and the base 40 and is pivotally connected to an upwardly disposed clamping extension 51 of the base 40 by a flat tubular resilient strip 52 so as to be swingable in spaced relation to the block 41 and base 40. The screw 38 permits of adjustment of the connection between the extension 37 and the block 50. The strip 52, at the outer end thereof in the extension 51, has its interior in communication with a fluid connection 53, and its inner end in communication with a space 54 in the interior of the block 50. In a specific use of the invention the fluid connection 53 can be connected to an indicator of any desired type, such as the indicator I, for indicating rate of flow.

The block 40 has a fluid supply connection 56 connected thereto to which fluid, preferably air, is supplied at constant pressure, from any desired source. The block 40 has an orifice 57 connected to the supply connection 56 and extending perpendicular to and terminating at a surface 58 of the block 40. The block 41 preferably also has a surface 59 in the same plane as the surface 58.

The block 50 has a surface 60 which is held in predetermined spaced relation to the surfaces 58 and 59 by the strip 52.

The block 50 has an orifice 61 in communication with the space 54 and perpendicular to and terminating at the surface 60 for coaction with the orifice 57.

The block 50 also has an orifice 62 in communication with the space 54, and perpendicular to and terminating at the surface 60 and in predetermined spaced relation to the orifice 61, with which an orifice 63 in the block 41 coacts. The orifice 63 is perpendicular to the surface 59 and is in communication with the fluid connection 36. The center to center distance of the orifices 57 and 63 is preferably the same as that of the orifices 61 and 62.

The diameters of orifices 57 and 61, and 62 and 63 are preferably proportional to their distances from the true fulcrum point of the hinge 52 so that both pairs of orifices may reach the zero or matching position simultaneously. This matching is aided by the use of the block 41 and its adjustable mounting. While the size of the pair of orifices 57 and 61 can be varied it has been found that satisfactory results will be obtained with a diameter of the order of twenty thousandths of an inch. In order to realize the greatest delivered pressure at the orifice 63 for a given supply pressure the orifices 62 and 63 should be smaller than the orifices 57 and 61.

The distance between the surfaces 58 and 59 and the surface 60 can also be varied, a spacing of the order of three thousandths of an inch has been found satisfactory.

The relationship between the size of the surfaces surrounding the orifices 57, 61, 62 and 63 and the diameter of these orifices can be varied but it has been found that surfaces extending outwardly about five such diameters give satisfactory results. The volume of the space 54 is such that the velocity of the fluid through the orifice 61 does not affect the velocity of the fluid through the orifice 62.

Assume that air under constant pressure is supplied through the fluid connection 56 to the orifice 57. If the displacement of the orifice 61 with respect to the orifice 57 is designated as $s$, the pressure $p_c$ delivered to the space 54 can be designated as $p_c = k_1 s$, where $k_1$ is a constant.

As the block 50 moves, the block 41 picks up from it a pressure proportional to the pressure within the space 54 and also proportional to the displacement of the block 50 or to $k_2 s$, where $k_2$ is a constant. Since the pressure in the space 54 is equal to $k_1 s$ the pressure, $p_b$, within the orifice 63 and the fluid connection 36 is:

$p_b = k_1 s$ times $k_2 s = k_3 s^2$ where $k_3$ is a constant

The pressure within the space 54 is transmitted through the hollow flexible strip 52 and the fluid connection 53 and thence to the instrument I while the pressure through the fluid connection 36 is effective in the chamber 35.

Referring now to Fig. 6, when flow occurs, as indicated the differential pressure $h$, is proportional to the square of the rate of flow $q$ and can be represented as:

$h = kq^2$, where $k$ is a constant

The differential pressure is applied across the diaphragm 16 and the resulting force is applied through the rod 18 to the lower end of the lever 20.

Fluid pressure through the fluid connection 36 is applied in the chamber 35 and the resulting force is applied through the rod 30 to the upper end of the lever 20. Since the pressure to the fluid connection 36 is proportional to the square of the displacement $s$ of the block 50 the force applied in the chamber 35 on the plate 31 is proportional to the square of the displacement.

Thus the lever 20 is balanced by two forces which are proportional to the squares of two quantities. The pressure in the space 54 and delivered through the fluid connection 53 to the instrument I is directly proportional to the displacement. Hence the reading of the instrument I is directly proportional to the rate of flow through the venturi 10.

As the lever 20 is balanced about the knife edge 28 by forces due to $h$ and $p_b$ acting with lever arms about the fulcrum point at 28 which can be identified as $l_1$ and $l_2$, the relations can be expressed as follows:

$$hk_4 l_1 = p_b k_5 l_2$$

where $k_4$ and $k_5$ are constants.
Since $$k_6 q^2 = k_7 s^2$$

then $$k_8 s = k_9 q$$

but $$s = \frac{p_c}{k_1}$$

and $$\frac{k_8 p_c}{k_1} = k_9 q$$

therefore $$p_c = k_{10} q, \ k_6 \text{ to } k_9$$

inclusive, all being constants.

The lever 20, through its extension 37 and the screw 38, moves the block 50, if the lever 20 is unbalanced, in a direction to change the pressure $p_b$ and restore the balance.

By varying the ratio of the lever arms $l_1$ and $l_2$, through adjustment of the position of the knife edge 28 the apparatus can be adapted to respond to various maximum flows through the primary metering device 10.

I claim:

1. The combination comprising a control lever having a fulcrum, first fluid pressure responsive means connected to said control lever at a predetermined location for applying a differential force on said control lever, second fluid pressure responsive means for applying a force on said lever at a predetermined location in opposition to the force applied by said first fluid pressure responsive means, and means for determining the force applied by said second fluid pressure responsive means comprising a movable member connected to said lever and positioned thereby and having an interior fluid pressure space, an indicating pressure take off connection in communication with said space, said movable member having a surface portion with a first receiving orifice and a first delivery orifice connected to said space, a fixed member having a surface portion in closely spaced relation to said first mentioned surface portion, said fixed member having a supply orifice for supplying fluid under pressure for delivery to said first receiving orifice and a second receiving orifice for delivery of pressure from said first delivery orifice, and a fluid connection from said second receiving orifice to said second fluid pressure responsive means, the pressure delivered through said fluid connection being proportional to the square of the displacement of said movable member.

2. The combination comprising a control member, first fluid pressure responsive means connected to said control member for applying a differential force on said control member, second fluid pressure responsive means for applying a force on said member in opposition to the force applied by said first fluid pressure responsive means, and means for determining the force applied by said second fluid pressure responsive means comprising a movable member connected to said control member and positioned thereby and having an interior fluid pressure space, an indicating pressure take off connection in communication with said space, said movable member having a surface portion with a first receiving orifice and a first delivery orifice connected to said space, a fixed member having a surface portion in closely spaced relation to said first mentioned surface portion, said fixed member having a supply orifice for supplying fluid under pressure for delivery to said first receiving orifice and a second receiving orifice for delivery of pressure from said first delivery orifice, and a fluid connection from said second receiving orifice to said second fluid pressure responsive means, the pressure delivered through said fluid connection being proportional to the square of the displacement of said movable member.

3. Measuring apparatus comprising a body member having a first surface portion, said body member having a first discharge orifice terminating at said first surface portion, a fluid connection in communication with a source of fluid under pressure connected to said orifice, a second body member movably mounted with respect to said first body member and having a second surface portion in predetermined closely spaced opposed relation to said first surface portion, said second body member having an interior fluid space and a first receiving orifice in communication with said space and extending to said second surface portion for relative movement with respect to said first discharge orifice and for delivery of fluid under pressure from said first discharge orifice, a pressure take off connection in communication with said space, and fluid delivery connections from said space including an additional fluid delivery orifice in said second body member in series through said fluid space with said first receiving orifice and terminating at a surface portion and an additional fluid receiving orifice in said first body member for delivery of pressure fluid from said additional fluid delivery orifice, the pressure delivered through said additional delivery orifice being proportional to the square of the displacement of said second body member.

4. Measuring apparatus comprising at least two body members each having a surface portion, one of said body members having a first discharge orifice terminating at its surface portion, a fluid connection in communication with a source of fluid under pressure connected to said orifice, another body member movably mounted with respect to said first body member and having its surface portion in predetermined closely spaced opposed relation to said first mentioned surface portion, said other body member having an interior fluid space and a first receiving orifice in communication with said space and extending to its surface portion for relative movement with respect to said first discharge orifice and for delivery of fluid under pressure from said first discharge orifice, a pressure take off connection in communication with said space, and fluid delivery connections from said space including an additional fluid delivery orifice in said second body member terminating at a surface portion and an additional fluid receiving orifice in a body member and terminating at its surface portion for delivery of pressure fluid from said additional fluid delivery orifice, the pressure delivered through said additional fluid receiving orifice being proportional to the square of the displacement of said other body member.

5. Measuring apparatus as defined in claim 4 in which said first mentioned pair of orifices are longitudinally spaced along said body members with respect to and are of larger size than the second mentioned pair.

6. Measuring apparatus comprising a body member having a surface portion, said body member having a first discharge orifice terminating at said surface portion, a fluid connection in communication with a source of fluid under pressure connected to said first discharge orifice, a second body member, a device for hingedly mounting said second body member with respect to said first body member, a member for moving said second body member, said second body member having a surface portion in predetermined closely spaced opposed relation to said first mentioned surface portion, said second body member having an interior fluid space and a first receiving orifice in communication with said space and extending to said second mentioned surface portion for relative movement with respect to said first discharge orifice and for delivery of pressure fluid from said first discharge orifice, a pressure take off connection in communication with said space, a block adjustably mounted on said first body member and having a surface portion coplanar with said first surface portion, and fluid delivery connections from said space including an additional fluid delivery orifice in said second body member terminating at its surface portion and an additional fluid receiving orifice in said block and terminating at its surface portion for delivery of pressure fluid, the pressure delivered through said additional fluid receiving orifice being proportional to the square of the displacement of said second body member.

7. Measuring apparatus as defined in claim 4 in which one of said body members has a zero setting portion movably mounted thereon with a position setting device in engagement therewith.

References Cited in the file of this patent

UNITED STATES PATENTS

| | | |
|---|---|---|
| 1,558,530 | Wunsch | Oct. 27, 1925 |
| 2,447,779 | Taplin | Aug. 24, 1948 |
| 2,459,542 | Rosenberger | Jan. 18, 1949 |
| 2,592,569 | Henderson | Apr. 15, 1952 |
| 2,599,159 | Bradlore | June 3, 1952 |
| 2,626,626 | Rosenberger | Jan. 27, 1953 |
| 2,827,020 | Cook | Mar. 18, 1958 |
| 2,849,013 | Callender | Aug. 26, 1958 |